(12) United States Patent
Thom

(10) Patent No.: US 6,531,243 B2
(45) Date of Patent: Mar. 11, 2003

(54) SOLID OXIDE FUEL OPERATING WITH AN EXCESS OF FUEL

(75) Inventor: Frank Thom, Düren (DE)

(73) Assignee: Forschungszentrum Jülich GmbH, Jülich (DE)

( * ) Notice: Subject to any disclaimer, the term of this patent is extended or adjusted under 35 U.S.C. 154(b) by 194 days.

(21) Appl. No.: 09/790,096

(22) Filed: Feb. 22, 2001

(65) Prior Publication Data

US 2001/0010873 A1 Aug. 2, 2001

Related U.S. Application Data

(63) Continuation-in-part of application No. PCT/DE99/02922, filed on Sep. 11, 1999.

(30) Foreign Application Priority Data

Sep. 14, 1998 (DE) .......................... 198 41 970
Sep. 2, 1999 (DE) .......................... 199 41 724

(51) Int. Cl.$^7$ .............................................. H01M 2/10
(52) U.S. Cl. .................. 429/96; 429/12; 429/13; 429/17
(58) Field of Search ........................ 429/12, 13, 17, 429/96

(56) References Cited

U.S. PATENT DOCUMENTS 5,998,056 A * 12/1999 Divisek et al. ............... 429/40
6,162,556 A * 12/2000 Vollmar et al. ............... 429/17

FOREIGN PATENT DOCUMENTS

DE 196 34 085 2/1998
EP 0 311 307 4/1989

OTHER PUBLICATIONS

Alqahtany Haytham et al. "Synthesis Gas Production From Methane Over an Iron Electrode in a Solid Electrolyte Cell", Journal of the Electrochemical Society, US, Electrochemical Society, vol. 140, No. 6, Jun. 01, 1993.

* cited by examiner

Primary Examiner—Carol Chaney
Assistant Examiner—Dah-Wei D. Yuan
(74) Attorney, Agent, or Firm—Klaus J. Bach

(57) ABSTRACT

In a method for operating a SOFC high-temperature fuel cell, wherein a hydrogen-containing fuel is converted internally in the fuel cell by an endothermic reaction at the anode thereof into a synthesis gas, which is converted by an exothermic reaction into electricity, fuel is supplied to the fuel cell, to cool the fuel cell, in an excess amount such that, with a predetermined average current density flow, the fuel utilization degree is below 40%, whereas the oxygen is supplied stoichiometrically corresponding to the amount of electricity generating requirements. No additional coolants are therefore reqired for the cooling of the fuel cell.

4 Claims, 2 Drawing Sheets

SOLID OXIDE FUEL OPERATING WITH AN EXCESS OF FUEL

This is a continuation-in-part application of international application PCT/DE99/02922 filed Sep. 11, 1999 and claiming the priority of German applications 198 41 970.8 filed Sep. 14, 1998 and 199 41 724.5 filed Sep. 2, 1999.

BACKGROUND OF THE INVENTION

The invention relates to a method of operating a fuel cell, wherein a hydrocarbon containing fuel is converted in the fuel cell into a synthesis gas with which the fuel cell is operated to generate electricity.

A fuel cell comprises a cathode, an electrolyte, and an anode. An oxidant such as air is supplied to the cathode and fuel such as hydrogen is supplied to the anode.

Various types of fuel cells are known as, for example, the SOFC fuel cell disclosed in the printed publication DE 44 30 958 C1 as well as the PEM fuel cell disclosed in the printed publication DE 195 31 852 C1.

The SOFC fuel cell is also called high temperature fuel cell since its operating temperature is up to 1000° C. In the presence of the oxidant oxygen ions are formed at the cathode of a high temperature fuel cell. The oxygen ions pass through the electrolyte and combine at the anode side with the hydrogen and/or carbon monoxide from the fuel. Electrons are released in the process whereby electric energy is generated. These electrochemical reactions are highly exothermic.

The operating temperature of a PEM fuel cell is about 80° C. At the anode of a PEM fuel cell, protons are formed by means of a catalyst in the presence of the fuel. The protons pass through the electrolyte and combine at the cathode side with the oxygen from the oxidant to form water. In this process electrons are released whereby electrical energy is generated.

For achieving a large electrical power output generally, several fuel cells are interconnected by connecting elements electrically and mechanically. An example for such a connecting element is the bipolar plate known from DE 44 10 74 C1. With bipolar plates, fuel cells, which are connected electrically in series, are stacked on top of one another. Such an arrangement is called a fuel cell stack.

As fuel, among others, methane and methanol may be provided. The fuels mentioned are converted for example to hydrogen or hydrogen-rich gas by reformation or oxidation.

It is known from DE 195 198 47 C1 to reform a fuel-like methane internally that is directly at, or within, the anode of a SOFC fuel cell. Alternatively, fuel is reformed in the interior of a fuel cell stack that is in additional chambers of a fuel cell stack (integrated reformation). With the internal or respectively, integrated reformation reaction, the endothermic reformation reaction is to draw the required heat from the exothermic electrochemical reaction. In this way, high efficiencies are to be achieved.

The printed publication DE 196 46 354 A1 discloses that fuel such as methanol can be oxidized at the anode of a PEM fuel cell by means of a catalyst such as platinum whereby hydrogen is released. The effects are comparable with those of the internal or integrated reformation.

It is practically impossible to convert a fuel such as hydrogen and/or carbon monoxide in a fuel cell completely to an electric current. The exhaust gas, which leaves the anode space of a fuel cell, will always contain a rest of the electrochemically active fuels mentioned above. The experts however are striving to minimize this rest of fuel in the exhaust gas.

A measure herefor is the fuel utilization degree, which is defined as follows:

$$BN\,[\%] = 1 - \frac{(2\dot{n}_{H2} + 2\dot{n}_{CO} + 8\dot{n}_{CH4})\ \text{exit}}{(2\dot{n}_{H2} + 2\dot{n}_{CO} + 8\dot{n}_{CH4})\ \text{entrance}}$$

Wherein ṅ indicates the respective mole flows in mol/h.

From EP 0 398 111 A a fuel cell arrangement is known, wherein $O_2$ and ballast gases as well as fuel are introduced into the fuel cell in excess and the gases are partially recirculated. In this way, fuel utilization degrees of about 90% can be achieved.

In the carbonate fuel cell known from DE 690 06 458 T2 natural gas is reformed internally within cooling plates which are arranged within the fuel cell. The fuel utilization degree achieved in this way is about 85%.

It is further known to introduce pre-reformed fuel into a SOFC fuel cell with internal reformation. Fuels such as natural gas whose main component is methane is partially externally reformed. A mixture of methane and the hydrogen-rich synthesis gas obtained by the pre-reformation is supplied to a fuel cell. Within the fuel cell, the methane contained in the mixture is also converted to a hydrogen-rich synthesis gas. By the pre-reformation, the higher hydrocarbons are disintegrated. This occurs because they are disadvantageously chemically unstable and therefore disintegrate easily while forming carbon. Besides the higher hydrocarbons, also the methane itself reacts to form carbon particularly by thermal cracking of methane:

$$CH_{4(g)} \rightleftharpoons 2H_{2(g)} + C_{(s)}$$

This reaction takes place preferably at temperatures above 650° C. (J. R. Rostrup-Nielson, Catalytic Steam Reforming, Springer Verlag, 1984). The carbon formation should preferably be avoided in the fuel cell.

An external procedure for generating hydrogen by catalytic reformation has the disadvantage of high heat input requirements. The required heat is provided for example by additional combustion of hydrocarbons. The process is therefore relatively expensive.

The endothermic reactions occurring in a fuel cell cannot compensate for the heat generated by the exothermic electrochemical reactions. In the state-of-the-art techniques, the heat balance in a fuel cell always provides for excess heat. A fuel cell therefore needs to be cooled by a coolant as it is shown for example in the printed publication DE 196 36 908 A1. In the high-temperature fuel cell substantial amounts of cooling air must be provided in order to remove the heat released by the electrochemical reactions as can be taken from the printed publications "Fuel Cell Systems L. Blomen, M. Mugerwa, Plenum Press 1993" or "Optimization of 200 KW SOFC co-generation plant, Part II: variation of the flow sheet; E. Riensche, J. Meusinger U. Stimming, G. Unverzagt; Journal of Power Sources 71 (1998), pp. 306–314". This results in large efficiency losses and increasing electric power generating expenses.

To cool a fuel cell requires energy. The efficiency of a fuel cell is reduced thereby. It would be advantageous to strive for an isothermal process wherein the heat budget of the fuel cell is balanced.

From the state of the art, combined processes are known wherein for example a fuel cell and a thermal power plant are coupled for the utilization of the excess heat of the fuel cell (DE 196 36 738 A1) or a fuel cell is coupled with a gas turbine (DE 40 32 993 C1).

A process for the manufacture of highly pure hydrogen or, respectively, synthesis gas which includes a fuel cell is also known from DE 196 36 068 C1. In this process, the isolated reaction space is brought for the reformation in thermal contact with the interior of a high-temperature fuel cell, which is operated at 300° C., but preferably above 500° C.

Based on the printed publication "Ch. Rechenauer, E. Achenbach, Dreidimensionale mathematische Modellierung des stationären und instationären Verhaltens oxidkeramischer Hochtemperatur-Brennstoffzellen (three-dimensional mathematical modelling of the stationary and instationary behavior of oxide-ceramic high temperature fuel cells) Jül-2752" known typical operating data of a single fuel cell are given in the following table:

|  | Cooling by air |
| --- | --- |
| Average current flow density [mA/cm$^2$] | 300 |
| Cell voltage [V] | 0.72 |
| Fuel gas utilization degree [%] | 80.5 |
| Active electrode surface [cm$^2$] | 78.2 |
| Gas entrance temperatures [° C.] | 750 |
| Total pressure [bar]: | 1.5 |
| Air exit temperature [° C.] | 851.7 |
| Watervapor-methane-ratio | 2.9 |
| Natural gas-pre-reformation degree [%] | 30 |
| Airflow: air ratio[–] | 6.8 |
| Fuel gas flow [mol/h] (entrance) | 0.938 |
| Material volume content: (entrance) |  |
| $CH_4$ | 0.131 |
| $H_2O$ | 0.487 |
| $H_2$ | 0.269 |
| $CO$ | 0.025 |
| $CO_2$ | 0.053 |
| $N_2$ | 0.035 |
| Fuel gas flow [mol/h] exit | 1.188 |
| Material volume content |  |
| $CH_4$ | — |
| $H_2O$ | 0.705 |
| $H_2$ | 0.102 |
| $CO$ | 0.024 |
| $CO_2$ | 0.143 |
| $N_2$ | 0.026 |

It is the object of the present invention to provide a method with which utilization, particularly of the waste heat of a fuel cell possible, is improved.

SUMMARY OF THE INVENTION

In a method for operating a SOFC high-temperature fuel cell, wherein a hydrogen-containing fuel is converted internally in the fuel cell by an endothermic reaction at the anode thereof into a synthesis gas, which is converted by an exothermic reaction into electricity, fuel is supplied to the fuel cell, to cool the fuel cell, in an excess amount such that, with a predetermined average current density flow, the fuel utilization degree is below 40%, whereas the oxygen is supplied stoichiometrically corresponding to the amount of electricity generating requirements, while the temperature difference of the operating media between the entrance into, and the exit from, the anode space as well as into, and from, the cathode space is not more than 20° C.

In accordance with the method, a hydrocarbon-containing fuel such as methanol, methane or ethanol is introduced into the interior of the fuel cell and is converted therein into a synthesis gas by endothermic reactions. The synthesis gas is converted to electricity partially by exothermic electrochemical reactions. The part of the synthesis gas, which could not be converted in the fuel cell into electricity can be collected in a container after leaving the fuel cell and/or can be supplied to a gas treatment unit which includes apparatus for cleaning and/or separating the gas and/or it can be utilized in an additional fuel cell for the generation of electricity. With an appropriate excess amount of fuel, no additional cooling of the fuel cell is required.

In contrast to the state of the art, the fuel to be reformed is supplied to the fuel cell in large excess. This is to be understood in such a way that, in comparison with the state of the art, substantially more of the fuel to be reformed is supplied to the fuel cell than the fuel cell can convert into electricity. The purpose is to avoid additional cooling of the fuel cell. The excess amount is therefore to be so selected that cooling of the fuel cell by air, which is not needed for the generation of electricity, or by other liquid or gaseous coolants is essentially avoided.

The heat removal in a fuel cell by endothermic reactions, in accordance with the invention, is approximated to the heat generation by exothermic reactions in an improved manner. Particular measures for cooling which have no other purpose, are reduced in this manner, or are, in the ideal case, totally eliminated.

A fuel cell, for example, is operated by pre-reformed natural gas. Herein, the material volume part of methane upon entering the fuel cell is, for example, >10%. A high excess in the sense of the invention is present in this fuel cell for example if, upon leaving the fuel cell, the mole content of hydrogen is at least 20% and the mole content of methane is less than 5%. A high excess in the sense of the invention is particularly then present if, at the exit of the fuel cell, the mole content of hydrogen is at least 40% and the mole content of the methane is less than 5%. The degree of fuel utilization is then below 40% preferably even below 30%. The amount of oxygen admitted (that is, air) is reduced practically to the minimum amount required for the generation of the electricity. No cooling by liquid or gaseous coolants (in addition to the operating media mentioned before) is required in an ideal case. A suitably controlled fuel excess has advantageous effects in combination with a minimized oxygen supply for an isothermic operation of the fuel cell such that inlet and outlet temperatures are approximately the same and a temperature gradient within the fuel cell is avoided. This can be realized for example with a metallic interconnector of steel (1.4742) of high heat conductivity.

The excess is preferably so adjusted that the heat resulting from the exothermic electrochemical reactions is utilized to at least 80%, preferably completely, for the endothermic methane reformation in the anode. The heat energy is utilized in this way substantially better in comparison to the state of the art. In the method according to the invention, the heat energy is utilized in a pre-planned manner for the generation of electricity as well as for the production of hydrogen and, respectively, synthesis gas.

Below the invention will be described in greater detail on the basis of the accompanying drawings.

As fuel natural gas is used to which water vapor is added at a rate at which the formation of carbon is excluded. In order to ensure a predetermined average area-specific current flow density in a single high temperature fuel cell stack, a theoretical minimum amount oxygen (air) is required which correlates with a stoichiometric minimum amount of fuel.

It is the aim to achieve an almost isothermic operation wherein, at the same time, the oxygen supply as much as possible stoichiometric.

The amount of oxygen admitted (for example, air) is for this purpose reduced to the stoichiometrically needed minimum. The possibly partially pre-reformed fuel gas, which is supplied at the anode side, is available in such an excess amount that a fuel utilization degree of less than 40%, preferably about 30% is obtained. The methane is converted catalytically within the high-temperature fuel cell, that is, immediately in, or at, the anode to hydrogen and carbon dioxide which however is not further converted electrochemically. With the endothermic methane reformation, the reaction heat released during the electrochemical reaction is consumed. The high temperature fuel cell stack is preferably so operated that the whole electrochemically generated energy is consumed by an internal methane reformation. The discharge gas, which has been enriched at the anode with hydrogen and carbon monoxide can be supplied to another high-temperature fuel cell stack or it may be utilized otherwise without the fuel cell. In this regard, it is for example advantageous to supply the gas from the fuel cell operation to gas cleaning or separation apparatus and/or gas storage installations. Also the gas may be subsequently combusted with the air conducted past the cathode (after-burner, boiler, furnace) so that an uncoupling of high-temperature heat is achieved, beyond the state of the art, which may be made available for use in a subsequent gas turbine and/or steam turbine power plant.

The introduction of combustion gas in excess provides for an efficient utilization of the electrochemical reaction heat and a greater uncoupling of high-temperature heat as this has been possible in connection with the state of the art processes.

Below the invention will be described in greater detail on the basis of the accompanying drawings.

DESCRIPTION OF PREFERRED EMBODIMENTS

Figure 1:
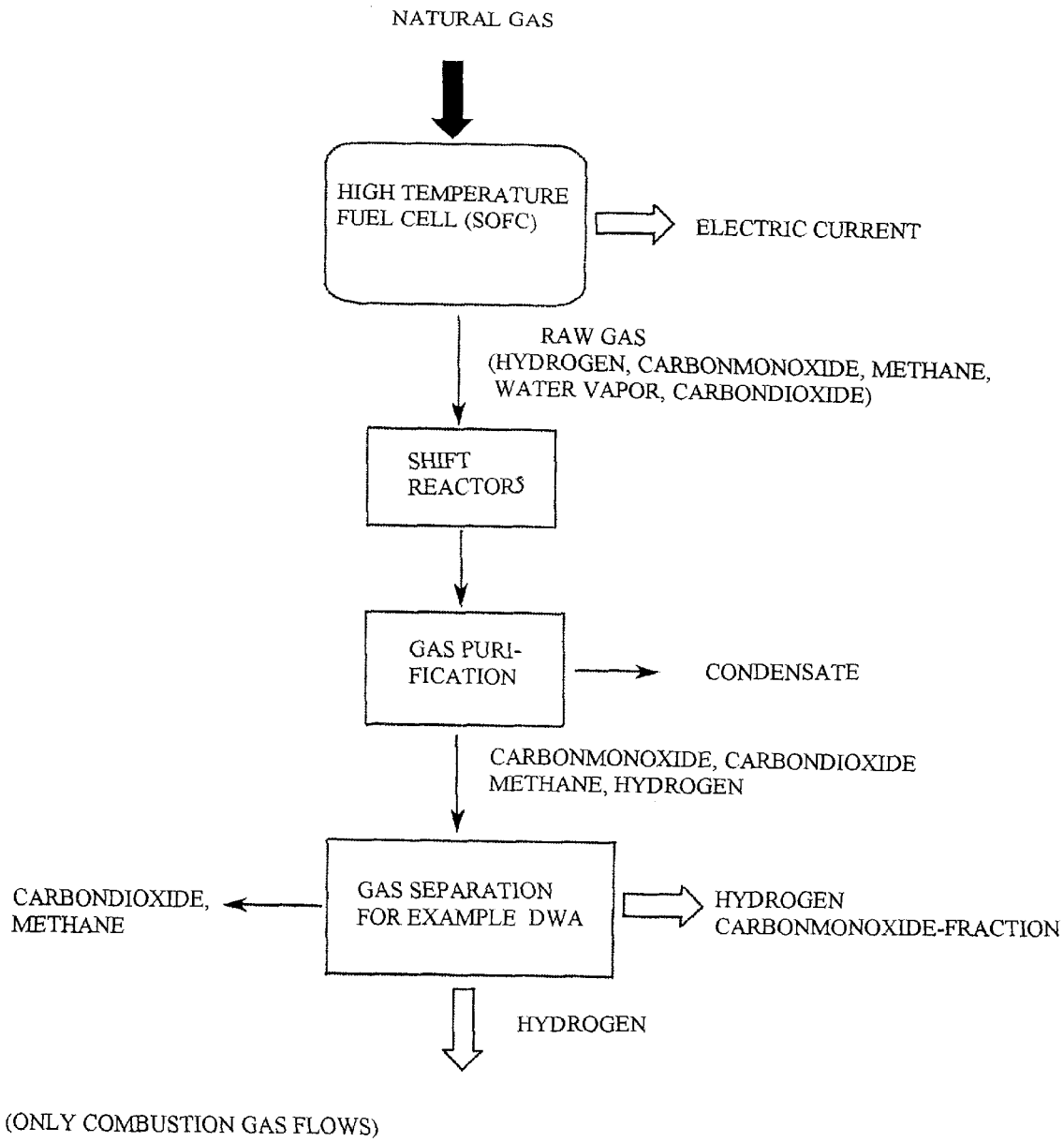
FIG. 1 shows an example of the invention for the production of electricity and hydrogen.

As shown in FIG. 1, at least one high-temperature fuel cells is employed which is provided with a pre-reformer for the conversion of higher hydrocarbons. Operating media as described in the earlier example are supplied thereto in a well-known manner. The excess fuel gas may be increased to such an extent that heat has to be supplied to the fuel cells in order to ensure an internal reformation. Such a mode of operation makes sense when the hydrogen content in the anode side discharge gas is to be very high (for example, >46%).

The raw gas (exhaust gas) obtained in this way is utilized for a subsequent production of hydrogen or other hydrogen-rich gases. For the treatment of raw gases, for example, low temperature processes may be used as they are known in the art. High purities (mole content $H_2 \gg 0.99$) and high yields can be achieved for example by washing processes and adsorption processes. (Ullmann's Encyclopedia of Industrial Chemistry, Vol. A13, 5$^{th}$ edition, 1989"). For example, the hydrogen content of the raw gas with utilization of the variable pressure adsorption procedure and a process, which uses conventional reformers, should be about 40%. Simulations show that this can be achieved with the method according to the invention.

Figure 2:
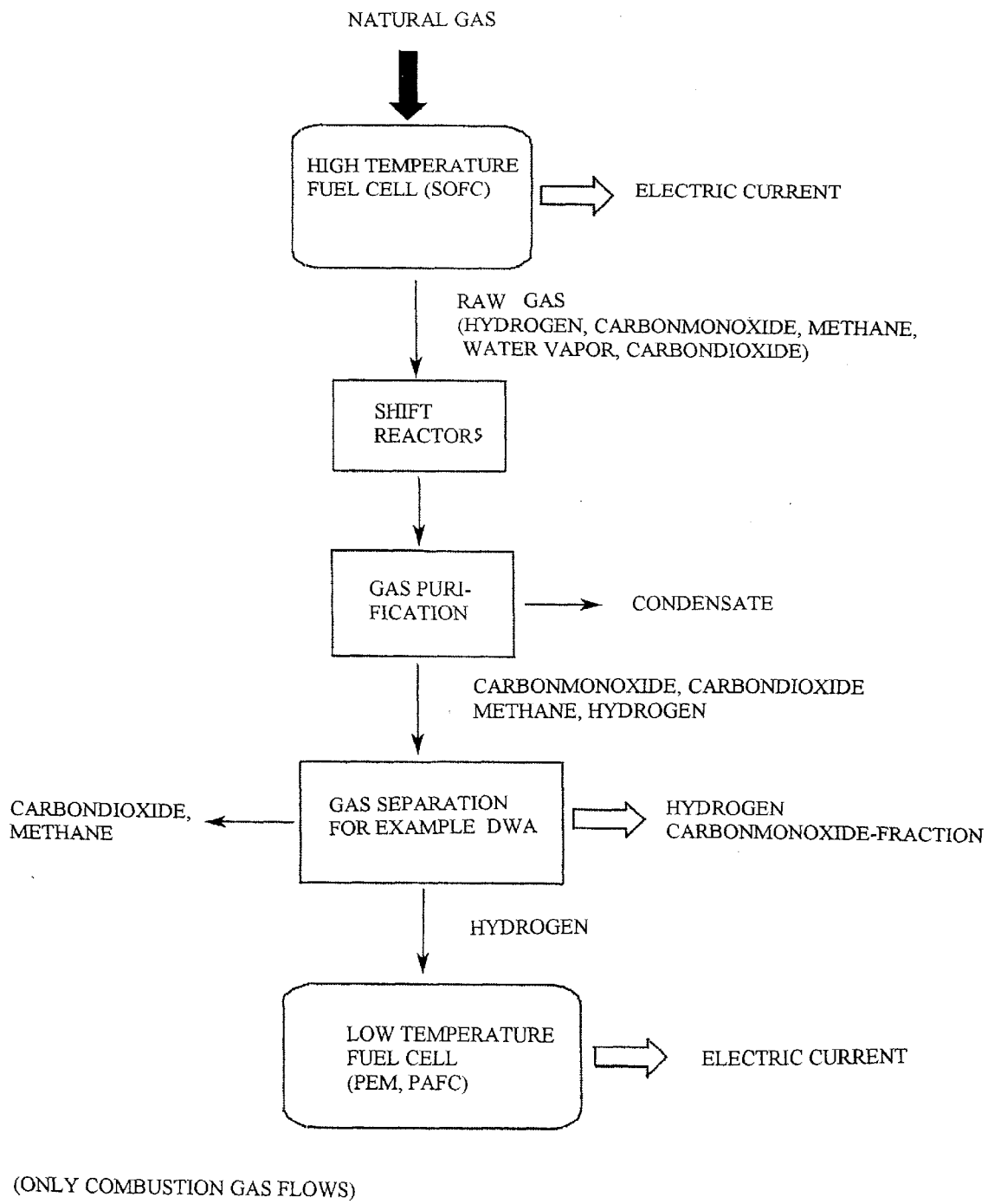
FIG. 2 shows another example of the invention wherein the hydrogen generated is used as fuel for a fuel cell and other combustable gases are generated for other uses.

The product hydrogen produced in accordance with the method of the invention is to be considered as being a valuable gas, which is utilized in the chemical industry for many syntheses. However, as indicated in FIG. 2, it is possible to utilize hydrogen directly in subsequent fuel cell plants for the production of additional electricity. A combined power plant comprising different types of fuel cells may be used. Such a combined power plant includes preferably at least one high temperature fuel cell stack, a shift reactor (processing apparatus in which the carbon monoxide contained in the discharge gas from the fuel cells is converted, see the literature source referred to above: Ullman's Encyclopedia), a gas purification unit for the discharge gas of the high temperature fuel cell stack, a PAFC- or PEM fuel cell stack as well as a generator. From the raw material which is natural gas, the high value products electricity and hydrogen or respectively, hydrogen-rich gases are produced. In the high temperature fuel cell stack according to the invention, the heat generated is removed practically completely by internal reformation of the combustion gas at the anode side.

In comparison with the conventional hydrogen generation processes, the reformers used in these processes are replaced by high temperature fuel cell stacks. As a result, the heat supply means required for the conventional external reformers are not needed since the heat is provided by the electrochemical reactions in the high temperature fuel cell stack. With the high temperature fuel cell stack a reformer is provided which generates electricity that can be used for satisfying the electric power requirements of a chemical plant (if the method is to be used in connection with an existing chemical plant—for example, for the replacement of a reformer wherein electricity is generated as a side product) or that can be supplied to the electrical power grid. The PEM- and/or PAFC fuel cell units for the generation of electricity are more productive since hydrogen is utilized as a "waste product of the high temperature fuel cell stack" after reformation of the gas.

The following table includes typical operating data of a high temperature fuel cell, which is cooled in accordance with the invention by internal reformation.

|  | Cooling by the addition of excess fuel which is reformed internally directly at the anode. |
| --- | --- |
| Average current flow density [mA/cm$^2$] | 300 |
| Cell voltage [V] | 0.72 |
| Fuel gas utilization degree [%] | 25.9 |
| Active electrode surface [cm$^2$] | 78.2 |
| Gas entrance temperatures [° C.] | 750 |
| Total pressure [bar]: | 1.5 |
| Air exit temperature [° C.] | 754 |
| Water vapor-methane-ratio | 3 |
| pre-reformation degree [%] | 30 |
| air ratio[—] | 1.42 |
| Combustion gas flow [mol/h] (entrance) | 2.091 |
| Mole parts: (entrance) |  |
| CH$_4$ | 0.131 |
| H$_2$O | 0.494 |
| H$_2$ | 0.265 |
| CO | 0.024 |
| CO$_2$ | 0.053 |
| N$_2$ | 0.033 |
| Fuel gas flow [mol/h] exit | 2.637 |
| Mole parts (exit) |  |
| CH$_4$ | — |
| H$_2$O | 0.405 |
| H$_2$ | 0.404 |

|  | Cooling by the addition of excess fuel which is reformed internally directly at the anode. |
| --- | --- |
| CO | 0.074 |
| $CO_2$ | 0.091 |
| $N_2$ | 0.026 |

What is claimed is:

1. A method for operating a high-temperature solid oxide fuel cell including an anode and a cathode, said method comprising the steps:

converting a hydrocarbon-containing fuel in the fuel cell internally, by an endothermic reaction directly at or in the anode, into a synthesis gas, and converting the synthesis gas in the fuel cell by an exothermic chemical reaction into electricity, wherein the fuel is supplied to the fuel cell at such an excess that the fuel utilization is below 40%, the temperature difference of the operating media between the entrance into, and the exit out of, the anode space as well as into, and respectively, out of, the cathode space is not more than 20° C., and, the oxygen is supplied to the fuel cell essentially stoichiometrically corresponding to the electric power generating requirement.

2. A method according to claim 1, wherein the fuel cell is operated at temperatures of below 700° C., preferably at temperatures of below 650° C.

3. A method according to claim 1, wherein the fuel utilization degree is below 30%.

4. A method according to claim 1, wherein the temperature difference of the operating media between its entrance into, and its exit from, the anode space and its entry into, and its exit from, the cathode space is not more than 10° C.

* * * * *